Oct. 6, 1964    R. D. PAVISO    3,151,763
CRYOGENIC GLASS-TO-METAL SEAL
Filed July 22, 1963    2 Sheets-Sheet 1
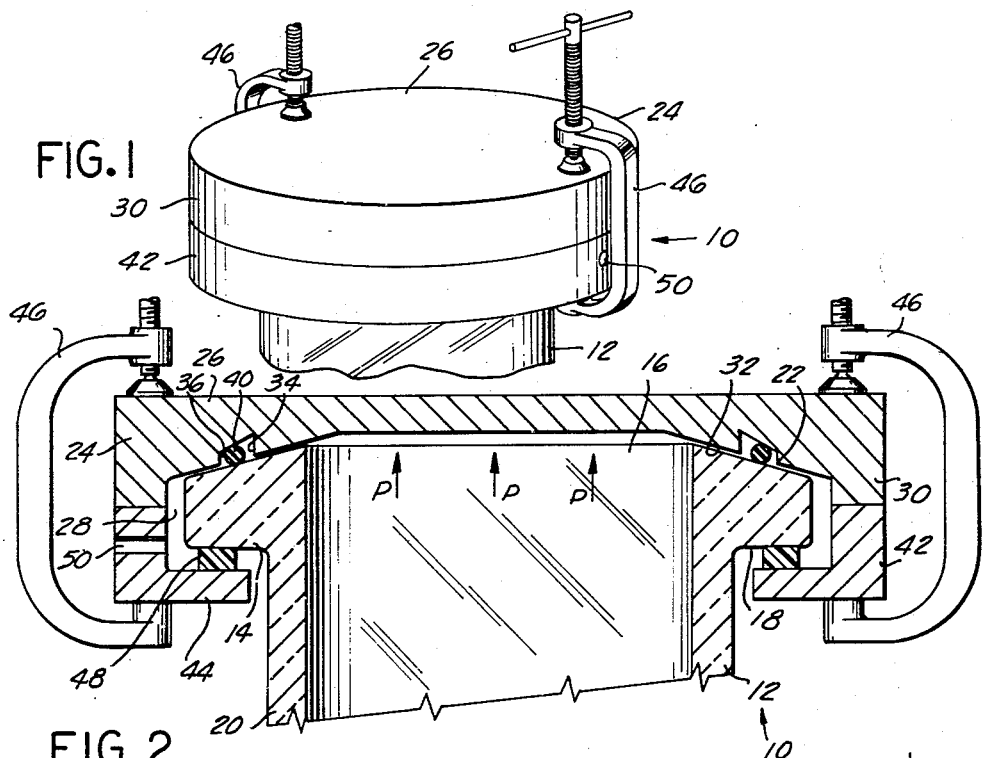
FIG. 1
FIG. 2
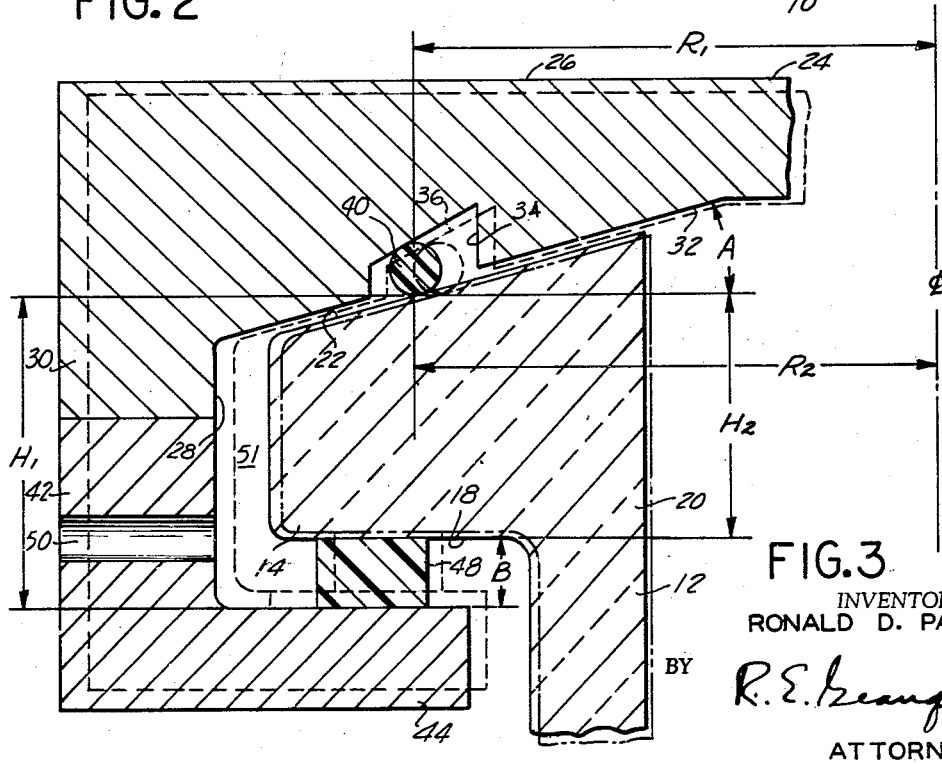
FIG. 3
INVENTOR.
RONALD D. PAVISO
BY R. E. Beangue
ATTORNEY Oct. 6, 1964 R. D. PAVISO 3,151,763
CRYOGENIC GLASS-TO-METAL SEAL
Filed July 22, 1963 2 Sheets-Sheet 2

INVENTOR.
RONALD D. PAVISO
BY
*R. E. Geangue*
ATTORNEY

United States Patent Office 3,151,763
Patented Oct. 6, 1964

3,151,763
CRYOGENIC GLASS-TO-METAL SEAL
Ronald D. Paviso, Northridge, Calif., assignor to The Marquardt Corporation, Van Nuys, Calif., a corporation of California
Filed July 22, 1963, Ser. No. 296,804
7 Claims. (Cl. 220—46)

This invention relates to mechanical sealing devices for cryogenic application, and more particularly to a cryogenic glass-to-metal seal.

Certain prior art glass-to-metal sealing devices for cryogenic temperatures operate on the principle of bonding the glass to metal. While generally satisfactory for cylindrical structures having small diameters, such sealing devices are impractical for sealing structures having large diameters.

Another type of sealing device employed in the prior art for large diameters comprises several rings of glass having higher and higher rates of thermal expansion which are bonded to a ring of low expansion alloy. The alloy ring is welded to a metal flange suitable for a metal-to-metal seal. This type of seal is rather expensive.

Seals can also be made using an epoxy cement or solder. These seals have the disadvantage that they cannot be readily disassembled.

Wax seals may also be employed, but the joint lacks strength.

In view of the foregoing factors and conditions characteristic of sealing devices for cryogenic temperatures, it is a primary object of the present invention to provide a new and useful cryogenic sealing device not subject to the disadvantages enumerated above and having means for maintaining a constant loading condition on a gasket, or related sealing device between two materials having dissimilar thermal expansion rates.

Another object of the present invention is to provide a new and improved sealing device for maintaining an effective seal between dissimilar materials during cryogenic cool-down when large thermal shrinkages occur in the two materials and the gasket sealing material.

Yet another object of the present invention is to provide a new and improved cryogenic glass-to-metal seal.

According to the present invention, a cryogenic glass-to-metal seal comprises a metal cover having a lower flange which may be held to the cover with C-clamps. The cover engages the top of a glass container and the flange underlies the neck of the glass container. The glass and metal parts are prevented from directly contacting each other by a suitable spacer. A predetermined angle is maintained on the glass and metal mating surfaces to enable the differential contraction of the glass and metal to be utilized in maintaining all sealing components in compression against the surfaces to be sealed. As cool-down occurs, the spacer, which has a coefficient of thermal expansion much greater than that of either glass or metal, tends to shrink away from the flange surface. At the same time, the metal cover and flange contract a greater amount than the glass and this partially or totally compensates for the shrinkage of the spacer, depending on the relative proportions of the components of the structure. A gasket or other suitable sealing device is employed between the metal cover and the top of the glass container and this gasket tends to shrink away from the surfaces being sealed at low temperatures. With the proper choice of angle on the glass and metal mating surfaces and the proper choice of relative proportions of the components of the structure, seal compression can be kept constant or even increased as temperatures go down. Flange loading on the glass is also kept constant so that no undue stress is placed on the glass.

One embodiment of the invention is designed for use with containers having internal pressure loading and another embodiment is designed for use with containers having external pressure loading.

The features of the present invention which are believed to be novel are set forth with particularity in the appended claims. The present invention, both as to its organization and manner of operation, together with further objects and advantages thereof, may best be understood by reference to the following descriptions, taken in connection with the accompanying drawings, in which:

FIGURE 1 is a perspective view of a first embodiment of the present invention;

FIGURE 2 is a cross-sectional view, on an enlarged scale, of the device of FIGURE 1;

FIGURE 3 is a partial, cross-sectional view similar to FIGURE 2 showing the relative positions of portions of the device at room temperature in solid lines and at low temperatures in broken lines;

Figure 4:
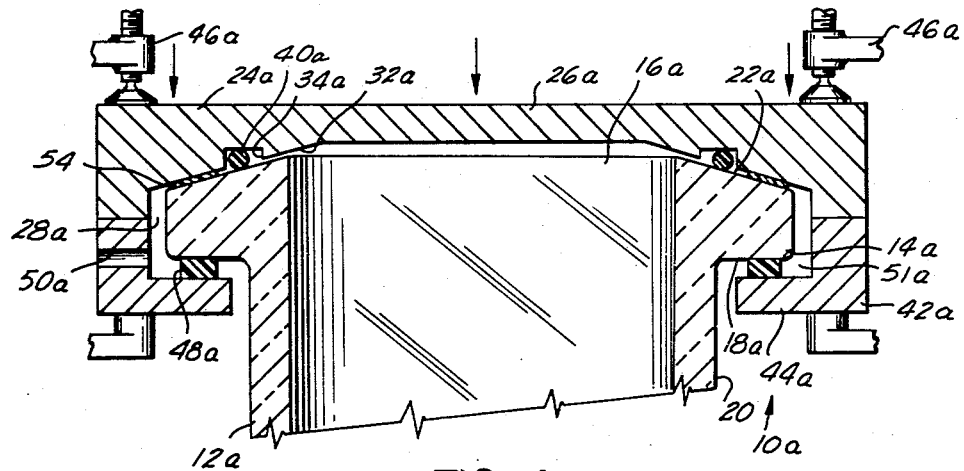
FIGURE 4 is a cross-sectional view of a second embodiment of the present invention.

Referring again to the drawing, and particularly to FIGURES 1–3, the sealing device constituting a first embodiment of the present invention, generally designated 10, includes a glass container 12 having an annular flange 14 encompassing its open top 16. The flange 14 includes a lower face 18 lying at substantially a right angle to the sidewall 20 of the container 12. The flange 14 also has an upper face 22 which forms a predetermined angle A with a line parallel to the face 18.

The container 12 is subjected to an internal pressure P and is closed with a metal cover 24 having a closed top 26, an open bottom 28 and an encompassing sidewall portion 30. The cover 24 also includes an internal land 32 which lies parallel with the upper face 22 of flange 14. An annular groove 34 is formed in the land 32 and its base 36 also lies at a predetermined angle with a line parallel to the lower face 18 of the flange 14.

An O-ring 40 is mounted in the groove 34 and forms a seal between the metal cover 24 and the glass container 12.

The metal cover 24 is secured to the glass container 12 by a metal flange 42 having an annular lip 44 extending subjacent the face 18 of flange 14 and lying parallel thereto. The flange 42 may be secured to the cover 24 by a plurality of C-clamps 46 and is maintained in spaced relation with the flange 14 by a spacer 48. A vent 50 is mounted in the flange 42 and relieves any trapped air or gas which may become compressed in the annular space 51 between the flange 14, the flange 42 and cover 24 during cool-down.

The angle A on the face 22 and the land 32 relative to the base 36 of groove 34 coupled with the relative proportions of the several dimensions $H_1$, $H_2$, $R_1$, $R_2$ and B enable the differential contraction of the glass and metal to be utilized in maintaining all sealing components in compression against the surfaces being sealed. As cool-down occurs, the spacer 48, which may be made of Teflon or other suitable material having a coefficient of thermal expansion much greater than that of either glass or metal, tends to shrink away from the face 18 and lip 44. However, at the same time, dimension $H_1$ decreases a greater amount than dimension $H_2$ due to the higher expansion rate of the metal than the glass. This compensates for the shrinkage of the spacer 48 either partially or completely depending upon the relative thickness of the spacer 48 compared to dimension $H_2$. The O-ring 40 also tends to shrink away from the surfaces being sealed. However, due, again to the greater thermal expansion of metal than glass, dimension $R_1$ will shrink more than dimension $R_2$ causing the groove 34 to decrease. All as shown in broken lines in FIGURE 3. It is apparent that the dimension $H_2$ may be decreased by making angle A steeper while dimension B remains constant.

Figure 5:
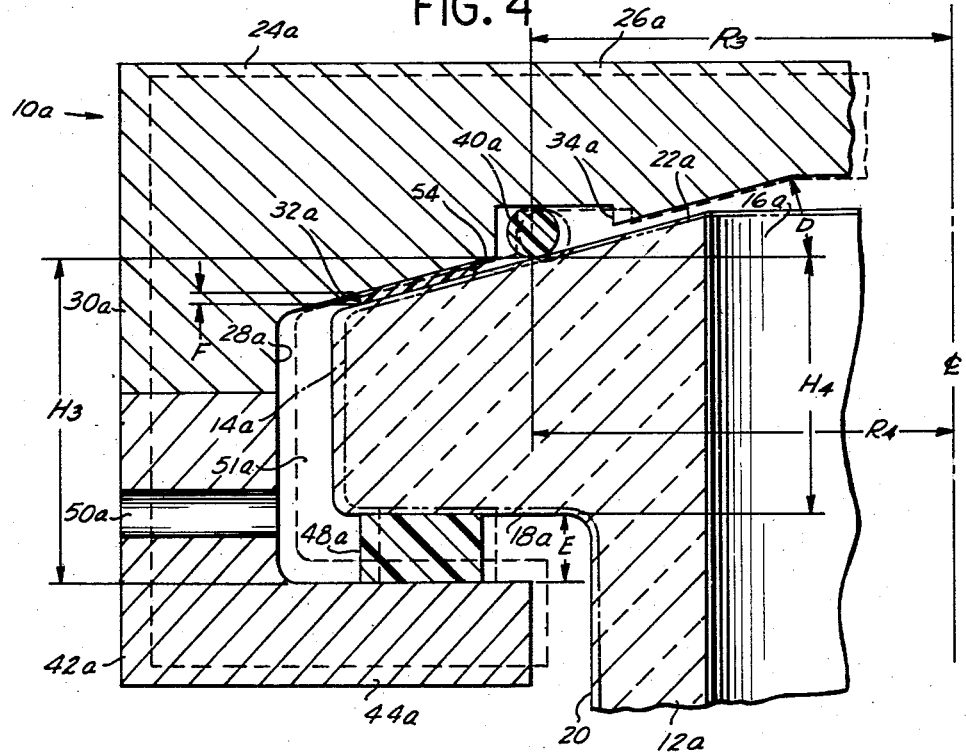
FIGURE 5 is a partial, cross-sectional view similar to FIGURE 4 showing the relative positions of portions of the device at room temperature in solid lines and at low temperatures in broken lines.

Referring now to FIGURES 4 and 5, a sealing device constituting a second embodiment of the present invention, generally designated 10a, includes a glass container 12a having a flange 14a encompassing its open top 16a. The flange 14a has a lower face 18a forming substantially a right angle with the sidewall 20 of container 12a and an upper face 22a forming an angle D with a line parallel to face 18a.

The container 12a is subjected to an external pressure loading and is closed with a cover 24a having a closed top 26a, an open bottom 28a, and an encompassing sidewall 30a. An internal, annular land 32a is formed on the inside of the cover 24a and extends between the side wall 30a and the top wall 26a. The land 32a lies substantially parallel to the upper face 22a of flange 14a. An annular groove 34a is formed on the land 32a to accommodate an O-ring 40a which serves to seal the cap 24a to the container 12a. Since the cap 24a is subjected to external pressure instead of internal pressure, as in the FIGURE 1 embodiment, a thin cushion 54 is mounted between the land 32a and the face 22a adjacent the groove 34a to cushion the cap 24a from the container 12a to avoid glass-to-metal contact and to keep the external pressure from over-compressing the O-ring 40a.

An annular flange 42a having a lip 44a which lies subjacent and parallel with the face 18a is secured to the cover 24a by a plurality of C-clamps 46a.

An annular, Teflon spacer 48a is mounted between the lip 44a and face 18a and is substantially similar to the spacer 48 in the first embodiment except that the spacer 48a may be reduced in thickness by an amount equal to the thickness of the upper cushion 54.

A vent 50a is mounted in a flange 42a to relieve any trapped air or gas which may become compressed in the annular space 51a between the flange 14a and the cap 24a.

In the second embodiment, the shrinkage of dimension $H_3$ will totally compensate for the combined shrinking of dimension $H_4+E+F$ within a temperature of 70° F. to $-320$° F. An angle D of 6° was found to be suitable for a container 12a made of a material with thermal expansion characteristics similar to those of Pyrex brand No. 7740 glass of the Corning Glass Works and having the following dimensions at room temperature:

(a) $H_3=1.532''$
(b) $H_4=1.257''$
(c) $E=0.275''$
(d) $R_3$ and $R_4=6.411''$

The container 12a of the above example was closed with a cover 24a made of 321 stainless steel and was cooled from 70° C. to a cryogenic temperature whereupon the parts assumed the relative positions shown in broken lines in FIGURE 5.

While the particular cryogenic glass-to-metal seals herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A device for maintaining a seal between dissimilar materials over wide temperature ranges comprising:
    a first annular flange having a first coefficient of thermal expansion, said first flange also having opposed, non-parallel faces;
    a second annular flange having a second coefficient of thermal expansion, said second flange also having a lip portion extending subjacent one of said faces and lying parallel thereto;
    a cover member having an annular land extending over the other of said faces and lying parallel thereto, said cover member having said second coefficient of expansion and including an encompassing sidewall engageable with said second flange to maintain said lip and said land in position relative to said first flange;
    an annular seal mounted on said land and engaging said other face, said seal having a third coefficient of thermal expansion; and
    an annular spacer mounted between said one face and said lip for maintaining said seal in sealing engagement with said other face, said spacer having said third coefficient of thermal expansion.

2. The device of claim 1 including an annular cushion mounted on said other face adjacent said seal, said cushion having said third coefficient of thermal expansion.

3. The device of claim 1 wherein said seal is mounted in an annular groove on said land.

4. The device of claim 3 wherein said groove has a base lying substantially parallel to said other face.

5. In combination with a container having an open top, a glass-to-metal seal comprising:
    an annular glass flange encompassing said open top, said glass flange having opposed, non-parallel faces;
    a metal flange having a lip portion extending subjacent one of said faces and lying parallel thereto;
    a metal cover having a closed top, an encompassing sidewall and an annular land, said land extending over the other of said faces and lying parallel thereto, said side wall engaging said second flange to maintain said lip and said land in position relative to said glass flange;
    an annular seal mounted on said land and engaging said other face; and
    an annular spacer mounted between said one face and said lip for maintaining said seal in sealing engagement with said other face.

6. The combination of claim 5 wherein said other face forms an angle of 6° with said one face.

7. The combination of claim 5 wherein said seal is mounted in an annular groove on said land.

References Cited in the file of this patent

UNITED STATES PATENTS

| | | |
|---|---|---|
| 2,548,934 | Beaird | Apr. 17, 1951 |
| 2,639,834 | Medley | May 26, 1953 |

UNITED STATES PATENT OFFICE
CERTIFICATE OF CORRECTION

Patent No. 3,151,763            October 6, 1964

Ronald D. Paviso

It is hereby certified that error appears in the above numbered patent requiring correction and that the said Letters Patent should read as corrected below.

In the grant, lines 2 and 12, and in the heading to the printed specification, lines 3 and 4, name of assignee, for "The Merquardt Corporation", each occurrence, read -- The Marquardt Corporation --.

Signed and sealed this 13th day of April 1965.

(SEAL)
Attest:

ERNEST W. SWIDER            EDWARD J. BRENNER
Attesting Officer            Commissioner of Patents